United States Patent Office 3,573,306
Patented Mar. 30, 1971

3,573,306
PROCESS FOR PREPARATION OF N-SUBSTITUTED
3,5-DIAMINO-6-HALOPYRAZINAMIDES
Kenneth L. Shepard, Ambler, and Edward J. Cragoe, Jr., Lansdale, Pa., assignors to Merck & Co., Inc., Rahway, N.J.
No Drawing. Filed Mar. 5, 1969, Ser. No. 804,663
Int. Cl. C07d 51/76
U.S. Cl. 260—250
17 Claims

ABSTRACT OF THE DISCLOSURE

A new process is described for the preparation of N-substituted-3,5-diamino-6-halopyrazinamides which comprises treating an amino compound with a novel, very reactive acylating compound, 3,5-diamino-6-halopyrazincarboxylic N,N-diphenylcarbamic anhydride. The products of the new process have utility as diuretic agents.

This invention relates to a process for the preparation of N-substituted - 3,5 - diamino-6-halopyrazinoic acid amides, and the starting materials for the novel process. The process is represented by the following equation:

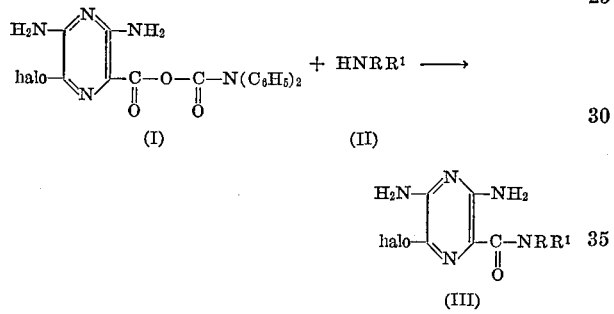

wherein R represents (1) amidino of structure

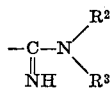

wherein
R$^2$ represents
(a) hydrogen,
(b) cyano,
(c) nitro,
(d) hydroxy,
(e) phenyl-lower alkoxy wherein the lower alkoxy group is of 1 to 3 carbon atoms e.g., methoxy, ethoxy, or propoxy,
(f) lower alkyl of 1 to about 5 carbon atoms e.g., methyl, ethyl, propyl, butyl, and pentyl, either straight or branch chained and either unsubstituted or substituted with such as (1) hydroxy, (2) phenyl, or (3) pyridyl, and
R$^3$ represents hydrogen or lower alkyl;

(2) guanidino of structure

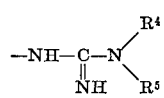

wherein
R$^4$ represents
(a) hydrogen,
(b) amino,
(c) phenyl, or (d) lower alkyl, of 1 to about 5 carbon atoms e.g., methyl, ethyl, propyl, butyl or pentyl, either straight or branch chained and either unsubstituted or substituted with such as (1) hydroxy, or (2) phenyl, and
R$^5$ represents
(a) hydrogen, or
(b) lower alkyl;

(3) amido, of structure
wherein

R$^6$ represents
(a) lower alkyl of 1 to about 5 carbon atoms, e.g., methyl, ethyl, propyl, butyl or pentyl, or
(b) mononuclear aryl, especially phenyl;

(4) amino, of structure
wherein

R$^7$ represents
(a) hydrogen,
(b) lower alkyl of 1 to about 3 carbon atoms, e.g., methyl, ethyl or propyl,
(c) heterocycle of 5 to 6 members containing 1 or 2 nuclear nitrogen atoms which heterocycle can be fused to a benzene ring, such as pyridyl, pyrimidinyl, quinolinyl, and imidazolinyl, or
(d) phenyl-lower alkyl wherein the lower alkyl group has from 1–3 carbon atoms,
R$^8$ represents
(a) hydrogen, or
(b) lower alkyl of 1 to about 3 carbon atoms, e.g., methyl, ethyl or propyl,
R$^7$ and R$^8$ when taken together represents phenyl-lower alkylidene, such as benzylidene, and
R$^7$ and R$^8$ when each represents lower alkyl can be linked directly together or through an oxygen atom to form, with the nitrogen atom to which they are attached, a saturated 5–7 membered heterocycle such as pyrrolidinyl, piperidino, hexahydro-1-azepinyl, and morpholino;

(5) heterocycle of 5–6 members containing 1 nitrogen atom and up to 2 other hetero atoms selected from nitrogen, oxygen and sulfur, either unsubstituted or substituted with lower alkyl or phenyl or fused to a benzene ring such as pyridyl, thiazolyl, triazolyl, benzimidazolyl, oxazolinyl, thiazolinyl and pyrimidinyl;

(6) lower alkyl of 1 to about 5 carbon atoms, e.g., methyl, ethyl, propyl, butyl and pentyl, either straight or branch chained and either unsubstituted or substituted with such as
(a) cyano,
(b) lower alkoxymethyl,
(c) di(lower alkoxy)methyl,
(d) lower alkoxycarbonyl,
(e) hydroxy,
(f) mononuclear aryl, especially phenyl,
(g) aromatic heterocycle of 5–6 members containing up to 1 hetero atom selected from oxygen and nitrogen, such as pyridyl or furyl, or (h) amino, of structure

wherein R⁹ represents
  (1) hydrogen,
  (2) lower alkyl, or
  (3) a heterocycle of 5–6 members containing up to 2 nitrogen atoms only, such as 2-imidazolinyl,
R¹⁰ represents
  (1) hydrogen, or
  (2) lower alkyl, and
R⁹ and R¹⁰ when lower alkyl can be linked together either directly or through an oxygen or nitrogen atom to form a 5–7 membered saturated heterocycle such as morpholino, pyrrolidinyl, piperidino, hexahydro - 1 - azepinyl and 4-methylpiperazino;
(7) lower alkenyl of 3 to 5 carbon atoms;
(8) lower alkynyl of 3 to 5 carbon atoms;
(9) mononuclear aryl, especially phenyl, either unsubstituted or substituted with
  (a) halo, such as chloro and bromo,
  (b) lower alkyl of 1–3 carbon atoms, or
  (c) lower alkoxy of 1–3 carbon atoms;
(10) sufamyl of structure

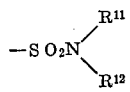

wherein R¹¹ represents
  (a) hydrogen,
  (b) lower alkyl of 1–3 carbon atoms,
  (c) phenyl-lower alkyl wherein the lower alkyl group has from 1–3 carbon atoms, or
  (d) phenyl, and
R¹² represents
  (a) hydrogen, or
  (b) lower alkyl;

(11)  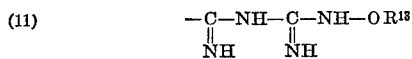

wherein
R¹³ represents
  (a) lower alkyl of 1–3 carbon atoms, or
  (b) phenyl-lower alkyl wherein the lower alkyl group has from 1–3 carbon atoms;
(12) cyano;
R¹ represents
  (1) hydrogen, or
  (2) lower alkyl;
R and R¹, when lower alkyl can be linked together directly to form with the nitrogen atom to which they are attached, a 3–7 membered saturated heterocycle such as, aziridinyl, and pyrrolidinyl, or can be linked together through a second heteroatom selected from oxygen and nitrogen, which when nitrogen can be substituted with lower alkyl, to form a 6 membered heterocycle with the nitrogen atom to which they are attached, such as morpholino, and 4-methylpiperazino;
R and R¹ when taken together can represent

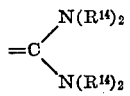

wherein R¹⁴ rpresents lower alkyl of 1–3 carbon atoms;
halo represents
  (1) chloro,
  (2) bromo, or
  (3) iodo.

Another embodiment of this invention is the novel 3,5-diamino-6-halopyrazinecarboxylic N,N - diphenylcarbamic anhydride of Formula I

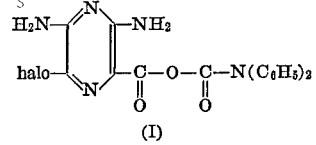

(I)

wherein halo is as defined above. These novel intermediates when used in the novel process of this invention are useful for preparing the amide derivatives, III, described above which products have utility as diuretic and natriuretic agents and are therefore useful in the management of conditions that manifest symptoms of excessive water and salt retention.

Prior to the present invention many of the products, III, were prepared by reaction of the appropriate amino compound, II, with an alkyl pyrazinoate. However, it was found that often, these esters failed to react or they reacted very slowly. Application of more severe reaction conditions usually only increased the amount of side reactions. Hence, a more reactive derivative of the pyrazinoic acids was required.

Surprisingly it was found that the mixed anhydride of Formula I is a stable yet extremely reactive acylating derivative.

The novel process of the present invention comprises combining the mixed anhydride of Formula I with the amine reactant of Formula II, in the presence of a suitable solvent.

The solvent employed may be any inert organic liquid in which both reactants are soluble and is usually one of the common lower alkanols such as ethanol, 1-propanol, or 2-propanol or a polar aprotic solvent such as tetrahydrofuran, dimethylformamide, acetonitrile, dimethylsulfoxide or the like.

The proportions of mixed anhydride to amine reactant is not critical. Stoichiometrically there is a 1:1 molar requirement, however, considering the relative availability of the two starting materials and because of difficulties posed by the presence of the reactive mixed anhydride during work-up procedures it is advantageous to use about 2 to 4 moles of amine per mole of mixed anhydride. Where the amine starting material is most readily available as an acid addition salt it is normally converted to the free base in situ before addition of the mixed anhydride by treating it with an excess of a common tertiary amine such as a tri(lower alkyl)amine or an alkali metal alkoxide. In some instances it is found desirable to first form the anion of the amine reactant, II, by addition of an equivalent of a strong base such as sodium hydride.

The reaction temperature is not critical. Although commonly conducted at a temperature between ambient and reflux temperature any reasonable temperature below ambient or above reflux is feasible if found necessary.

Isolation of the product can be effected by standard procedures, is straight forward, and not seriously complicated by excess amine reactant and by-products, and can be accomplished by direct crystallization of the product from the cooled reaction mixture, forcing crystallization by quenching with a miscible solvent, by evaporation of the solvent at reduced pressure or by any other known procedure. In each case the solid product is collected, washed and recrystallized by standard chemical techniques.

The mixed anhydride starting material is prepared by the following reaction:

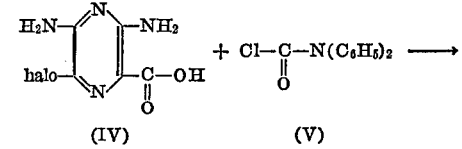

(IV)     (V)

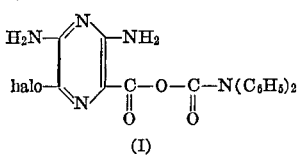

3,5-diamino-6 - halopyrazinoic acid is treated advantageously with at least a molar equivalent of diphenylcarbamoyl chloride in the presence of an acid acceptor, such as a tertiary amine, preferably a tri(lower alkyl)-amine such as trimethylamine, triethylamine, tributylamine or the like in a solvent in which the pyrazinoic acid is reasonably soluble, such as dimethylsulfoxide, dimethyl formamide or the like. The reaction is conducted at about ambient temperatures for from 10 to about 48 hours, 24 hours usually being sufficient.

The following preparations describe the synthesis of the mixed anhydride starting material and the examples illustrate the novel process of this invention.

PREPARATION OF STARTING MATERIALS 3,5-diamino-6-chloropyrazinecarboxylic N,N-diphenylcarbamic anhydride Diphenylcarbamoyl chloride (2.31 g., 0.01 mole) is added to a solution of 3,5-diamino-6-chloropyrazinoic acid (1.9 g., 0.01 mole) and triethylamine (1.5 ml.) in dimethylformamide (20 ml.) and the resulting solution is stirred at room temperature for twenty-four hours. The reaction mixture is diluted with water (100 ml.) and the solid that separates on stirring is collected and washed with acetonitrile (10 ml.), yield 1.08 g., M.P. 212–215° C. (dec.). Recrystallization from acetonitrile gives 3,5-diamino-6 - chloropyrazinecarboxylic N,N-diphenylcarbamic anhydride, M.P. 228–230° C. (dec.).

Analysis.—Calcd. for $C_{18}H_{14}ClN_5O_3$ (percent): C, 56.33; H, 3.68; N, 18.25. Found (percent): C, 56.13; H, 3.43; N, 18.40.

Employing the procedure substantially as described above but substituting for the 3,5 - diamino-6-chloropyrazinoic acid used therein, equivalent amounts of 3,5-diamino-6-bromopyrazinoic acid and 3,5-diamino-6-iodopyrazinoic acid, there are produced respectively 3,5-diamino-6-bromopyrazinecarboxylic N,N-diphenylcarbamic anhydride and 3,5 - diamino - 6-iodopyrazinecarboxylic N,N-diphenylcarbamic anhydride.

3,5-diamino-6-iodopyrazinoic acid

A mixture of finely ground methyl 3,5-diamino-6-iodopyrazinoate (0.50 mole), isopropyl alcohol (1875 ml.) and 5% aqueous sodium hydroxide solution (625 ml.) is heated under reflux, with vigorous stirring, for one hour. Water (7500 ml.) is added to the cooled reaction mixture and the resulting clear solution is made acid to Congo red paper by the addition of concentrated hydrochloric acid. The solid which separates is collected, dried and recrystallized from dimethylsulfoxide to give 3,5-diamino-6-iodopyrazinoic acid.

EXAMPLE 1

1-(3,5-diamino-6-chloropyrazinoyl)guanidine

Sodium (0.09 g., 0.004 mole) is dissolved in refluxing isopropyl alcohol (15 ml.) and guanidine hydrochloride (0.382 g., 0.004 mole) is added. The mixture is refluxed for one-half hour, 3,5-diamino-6-pyrazinecarboxylic N,N-diphenylcarbamic anhydride (0.383 g., 0.001 mole) is added and the mixture is refluxed an additional hour. The reaction mixture is diluted with water (30 ml.) and acidified with dilute hydrochloric acid. The solid that separates on standing is collected and dried, 0.20 g., M.P. 290–293° C. (dec.).

Solution in water and neutralization with dilute sodium hydroxide solution causes precipitation of 1-(3,5-diamino-6 - chloropyrazinoyl)guanidine, M.P. 240.5–241.5° C. (dec.).

EXAMPLE 2

1,1,3,3-tetramethyl-2-(3,5-diamino-6-chloropyrazinoyl)-guanidine

A solution of 1,1,3,3-tetramethylguanidine (3.45 g., 0.03 mole) and 3,5-diamino-6-chloropyrazinecarboxylic N,N-diphenylcarbamic anhydride (3.83 g., 0.01 mole) in tetrahydrofuran (150 ml.) is stirred at room temperature for twenty-two hours. The tetrahydrofuran is removed under reduced pressure and hexane (100 ml.) is added to the residue. The light yellow solid that forms is collected and dried, 2.2 g., M.P. 101–121° C. Recrystallization from toluene gives 1,1,3,3 - tetramethyl - 2-(3,5-diamino-6-chloropyrazinoyl)guanidine melting at 166.5–167.5° C.

Analysis.—Calcd. for $C_{10}H_{16}ClN_7O$ (percent): C, 42.03; H, 5.64; N, 34.32. Found (percent): C, 42.16; H, 5.28; N, 34.51.

EXAMPLE 3

1-(3,5-diamino-6-chloropyrazinoyl)-3-cyanoguanidine

Cyanoguanidine (33.6 g., 0.40 mole) is added to a mixture of sodium hydride (60% dispersion in mineral oil, 16.0 g., 0.40 mole) in dimethylformamide (250 ml.) and allowed to stir until the evolution of hydrogen gas is complete. The reaction mixture is cooled to 10° C. and 3,5-diamino-6-chloropyrazinecarboxylic N,N - diphenylcarbamic anhydride (38.4 g., 0.10 mole) is added. This mixture is allowed to come to room temperature over a period of twenty-four hours, and then poured into water (600 ml.). The mineral oil is extracted into ether (200 ml.), and the aqueous portion is acidified with glacial acetic acid (75 ml.). The yellow solid that precipitates after acidification is collected and dried, 20.0 g., M.P. >300° C. Recrystallization from dimethylformamide and water gives material melting above 300° C.

Analysis.—Calcd. for $C_7H_7ClN_8O$ (percent): C, 33.01; H, 2.77; N, 44.01. Found (percent): C, 33.39; H, 2.60; N, 43.74.

EXAMPLE 4

N-methyl-N-cyanomethyl-3,5-diamino-6-chloropyrazinecarboxamide

A mixture of triethylamine (4.5 ml.), methylaminoacetonitrile hydrochloride (3.21 g., 0.03 mole), and 3,5-diamino-6-chloropyrazinecarboxylic N,N - diphenylcarbamic anhydride (3.83 g., 0.01 mole) in tetrahydrofuran (150 ml.) is refluxed for twenty-four hours. The mixture is filtered and the filtrate is evaporated to dryness under reduced pressure. The residue is recrystallized from ethanol to give N-methyl-N-cyanomethyl-3,5-diamino-6-chloropyrazinecarboxamide, 1.28 g., M.P. 182–183° C.

Analysis.—Calcd. for $C_8H_9ClN_6O$ (percent): C, 39.92; H, 3.77; N, 34.92. Found (percent): C, 40.11; H, 3.74; N, 35.02

EXAMPLE 5

N-(2,2-diethoxyethyl)-3,5-diamino-6-chloropyrazinecarboxamide

A solution of 2,2-diethoxyethylamine (2.66 g., 0.02 mole) and 3,5-diamino-6-chloropyrazinecarboxylic N,N-diphenylcarbamic anhydride (3.83 g., 0.01 mole) in tetrahydrofuran is stirred at room temperature for one hour. The tetrahydrofuran is removed under reduced pressure and butyl chloride (50 ml.) is added to the residue. The light yellow solid is collected and dried, 2.62 g., M.P. 140–143° C. Recrystallization from butyl chloride gives pure N-(2,2-diethoxyethyl)-3,5-diamino-6-chloropyrazinecarboxamide, M.P. 146–148° C.

Analysis.—Calcd. for $C_{11}H_{18}ClN_5O_3$ (percent): C, 43.49; H, 5.97; N, 23.06. Found (percent): C, 43.96; H, 5.85; N, 22.90.

EXAMPLE 6

N-(2-morpholinoethyl)-3,5-diamino-6-chloropyrazinecarboxamide 2-morpholinoethylamine (0.75 ml.) is added to a solution of 3,5-diamino-6-chloropyrazinecarboxylic N,N-diphenylcarbamic anhydride (1.92 g., 0.005 mole) in dimethylformamide (10 ml.). The solution is stirred at room temperature for one hour then diluted with water (50 ml.). The solid that precipitates on standing is filtered, washed with water and ethanol, and dried to give 1.02 g. of N-(2-morpholinoethyl)-3,5-diamino-6-chloropyrazinecarboxamide, M.P. 178–180° C.

EXAMPLE 7

N-(4-pyridylmethyl)-3,5-diamino-6-chloropyrazinecarboxamide

A solution of 4-aminomethylpyridine (2.16 g., 0.02 mole) and 3,5-diamino-6-chloropyrazinecarboxylic N,N-diphenylcarbamic anhydride (3.83 g., 0.01 mole) in tetrahydrofuran (150 ml.) is refluxed for two hours. The tetrahydrofuran is removed under reduced pressure, butyl chloride (50 ml.) is added to the residue and the solid collected and dried. N-(4-pyridylmethyl)-3,5-diamino-6-chloropyrazinecarboxamide is obtained as a yellow solid, 2.5 g., M.P. 210–220° C. Recrystallization from acetonitrile gives material melting at 211–222° C. (dec.).

*Analysis.*—Calcd. for $C_{11}H_{11}ClN_6O$ (percent): C, 47.40; H, 3.98; N, 30.16. Found (percent): C, 47.58; H, 4.06; N, 30.16.

EXAMPLE 8

N-(2-pyridyl)-3,5-diamino-6-chloropyrazinecarboxamide

A solution of 2-aminopyridine (1.88 g., 0.02 mole) and 3,5-diamino-6-chloropyrazinecarboxylic N,N - diphenylcarbamic anhydride (3.83 g., 0.01 mole) in tetrahydrofuran (150 ml.) is refluxed for forty-eight hours. The solvent is removed under reduced pressure and ethanol (50 ml.) is added to the residue. The solid present is filtered and dried, 1.37 g., M.P. 207–216° C. Recrystallization from isopropyl alcohol gives N-(2-pyridyl)-3,5-diamino-6-chloropyrazinecarboxamide of M.P. 216.5–219.5° C.

EXAMPLE 9

3,5-diamino-6-chloropyrazinecarboxylic acid 1,2-dimethylhydrazide

Triethylamine (56 ml.) is added to a solution of 1,2-dimethylhydrazine dihydrochloride (26.6 g., 0.20 mole) in dimethylformamide (400 ml.). The triethylamine hydrochloride that precipitates is filtered and 3,5-diamino-6-chloropyrazinecarboxylic N,N-diphenylcarbamic anhydride (19.2 g., 0.05 mole) is added to the filtrate. The resulting solution is allowed to stir at room temperature for three and one-half hours. The dimethylformamide is removed under reduced pressure and water (100 ml.) is added to the residue. The light yellow solid that forms is collected, washed with butyl chloride (125 ml.) and dried to give 3,5-diamino-6-chloropyrazinecarboxylic acid 1,2-dimethylhydrazide, M.P. 131–136° C.

EXAMPLE 10

3,5-diamino-6-chloropyrazinecarboxylic acid 1-methyl-2-benzylidenehydrazide

A solution of benzaldehyde 2-methylhydrazone (2.0 g.) and 3,5-diamino-6-chloropyrazinecarboxylic N,N-diphenylcarbamic anhydride (1.92 g., 0.005 mole) in acetonitrile (75 ml.) is refluxed for two hours, concentrated to 50 ml. and chilled. The solid that separates is collected and dried, 1.10 g., M.P. 205–207° C. Recrystallization from acetonitrile gives 3,5-diamino-6-chloropyrazinecarboxylic acid 1-methyl-2-benzylidenehydrazide of M.P. 208–209.5° C.

*Analysis.*—Calcd. for $C_{13}H_{13}ClN_6O$ (percent): C, 51.23; H, 4.30; N, 27.58. Found (percent): C, 50.93; H, 4.14; N, 27.49.

EXAMPLE 11

N-(3,5-diamino-6-chloropyrazinoyl)morpholine

A solution of morpholine (3 ml.) and 3,5-diamino-6-chloropyrazinecarboxylic N,N - diphenylcarbamic anhydride (3.83 g., 0.01 mole) in tetrahydrofuran is stirred at room temperature for three hours. The tetrahydrofuran is removed under reduced pressure and butyl chloride (50 ml.) is added to the residue. The solid is collected and dried, 2.40 g., M.P. 196–200° C. Recrystallization from acetonitrile gives N-(3,5-diamino - 6 - chloropyrazinoyl)morpholine, M.P. 207.5–209.5° C.

*Analysis.*—Calcd. for $C_9H_{12}ClN_5O_2$ (percent): C, 41.95; H, 4.70; N, 27.18. Found (percent): C, 42.08; H, 4.79; N, 27.11.

Examples 1 through 11 demonstrate a variety of reaction conditions with respect to solvent, time, temperature, and method of isolation of the product. Employing these procedures described in Examples 1 to 11, and referred to in Table I, but substituting for the particular reactants employed therein, equivalent amounts of the several amines of structure HNRR[1] and the 3,5-diamino-6-halopyrazinecarboxylic N,N-diphenylcarbamic anhydride described in Table I, there are produced the N-RR[1]-3,5-diamino - 6 - halopyrazinecarboxamides also described in Table I.

TABLE I

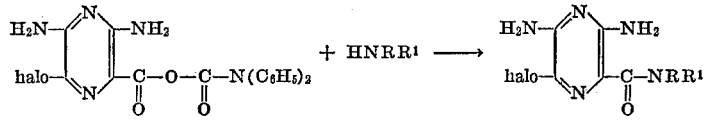

| Example | Procedure of Example | halo | R | R[1] | M.P. (° C.) |
|---|---|---|---|---|---|
| 12 | 1 | Cl | —C(=NH)—NHCH₃ | H | 252–254 |
| 13 | 1 | Cl | —C(=NH)—N(CH₃)₂ | H | 277 (HCl, H₂O) |
| 14 | 1 | Cl | —C(=NH)—NHCH₂CH₂OH | H | 228.5–229.5 (HCl) |
| 15 | 1 | Cl | —C(=NH)—NHCH₂—C₆H₅ | H | 215–216 |
| 16 | 1 | Cl | —C(=NH)—NH(CH₂)₂—C₆H₅ | H | 219–221.5 |

TABLE I—Continued

| Example | Procedure of Example | halo | R | R¹ | M.P. (° C.) |
|---|---|---|---|---|---|
| 17 | 1 | Cl | —C(=NH)—NHCH₂-(3-pyridyl) | H | 280.5–283.5 (2 HCl) |
| 18 | 1 | Cl | —C(=NH)—NH—OH | H | 200–202 |
| 19 | 1 | Cl | —C(=NH)—NH—OCH₂—C₆H₅ | H | 163–166 |
| 20 | 3 | Cl | —C(=NH)—NHNO₂ | H | >300 |
| 21 | 1 | Cl | —NH—C(=NH)—NH₂ | H | 280–282 |
| 22 | 1 | Cl | —NH—C(=NH)—NHCH₂—C₆H₅ | H | 243–246 |
| 23 | 1 | Cl | —NH—C(=NH)—NHNH₂ | H | 196–200 (H₂O) |
| 24 | 1 | Cl | —NH—C(=N—CH₂CH₂—)—NH (imidazoline) | H | 250–251 |
| 25 | 2 | Cl | —C₆H₅ | H | 198–202 |
| 26 | 2 | Cl | —C₂H₅ | H | 205–206 |
| 27 | 7 | Cl | —CH₂CO₂C₂H₅ | H | 174–175 |
| 28 | 11 | Cl | —(CH₂)₂— | | 179–181 |
| 29 | 11 | Cl | —(CH₂)₅— | | 186.5–187.5 |
| 30 | 5 | Cl | —CH₂CH₂(OC₂H₅)₂ | CH₃— | 116.5–118.5 |
| 31 | 7 | Cl | —CH₂-(2-pyridyl) | H | 209–211 |
| 32 | 7 | Cl | —CH₂-(3-pyridyl) | H | 242–244 |
| 33 | 7 | Cl | —CH₂CH₂-(4-pyridyl) | H | 193–196 |
| 34 | 7 | Cl | 4-phenylthiazol-2-yl | H | >300 |
| 35 | 7 | Cl | pyridyl | H | 269–271 |
| 36 | 7 | Cl | thiazolyl | H | 237–240 |
| 37 | 8 | Cl | 1,2,4-triazolyl | H | >300 |
| 38 | 7 | Cl | benzimidazolyl | H | 170–173 |
| 39 | 5 | Cl | 4-phenyloxazol-2-yl | H | 210–211 |
| 40 | 1 | Cl | —C(=NH)—C₆H₅ | H | 221–224 |

TABLE I—Continued
| Example | Procedure of Example | halo | R | R¹ | M.P. (° C.) |
|---|---|---|---|---|---|
| 41 | 5 | Cl | —N(CH₃)₂ | H | 199–206 |
| 42 | 5 | Cl | —NH₂ | CH₃— | 173–174.5 |
| 43 | 5 | Cl |  | H | 224–225.5 |
| 44 | 5 | Cl | 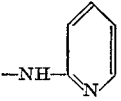 | H | 286–290 |
| 45 | 5 | Cl |  | H | 262–263(H₂O) |
| 46 | 5 | Cl | 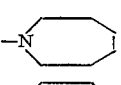 | H | 190–192 |
| 47 | 5 | Cl | 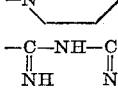 | H | 244–245 |
| 48 | 1 | Cl | —C(=NH)—NH—C(=NH)—NHOCH₂C₆H₅ | H | 198–199 |
| 49 | 7 | Cl | 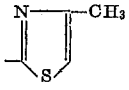 | H | 237–238 |
| 50 | 3 | Cl | —SO₂NH₂ | H | 193.5–194.5 |
| 51 | 7 | Cl | 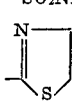 | H | >340(HCl) |
| 52 | 3 | Cl | —CN | H | >330 |
| 53 | 6 | Cl | —(CH₂)₂—N(CH₃)(CH₂)₂CH₃ | H | |
| 54 | 2 | I | —CH₂CH₂OH | H | |
| 55 | 2 | Br | —CH₂— 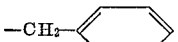 | H | |
| 56 | 6 | Cl | (CH₂)₂N(CH₃)₂ | H | |
| 57 | 6 | Cl | 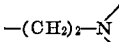 | H | |
| 58 | 6 | Cl | 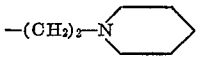 | H | |
| 59 | 6 | Cl | 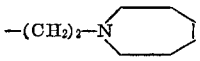 | H | |
| 60 | 6 | Cl |  | H | |
| 61 | 6 | Cl | 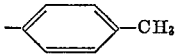 | H | |
| 62 | 2 | Cl | 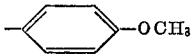 —Cl | H | |
| 63 | 2 | Br | —⟨⟩—CH₃ | H | |
| 64 | 2 | Cl | —⟨⟩—OCH₃ | H | |
| 65 | 2 | Cl | —CH₂CH=CH₂ | H | |
| 66 | 2 | Cl | —CH₂C≡CH | H | |
| 67 | 7 | Cl | —CH₂ 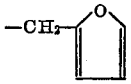 | H | |

TABLE I—Continued

| Example | Procedure of Example | halo | R | R¹ | M.P. (° C.) |
|---|---|---|---|---|---|
| 68 | 5 | Cl | —N(CH₃)(CH₂—C₆H₅) | H | |
| 69 | 5 | Cl | —N(morpholino) | H | |
| 70 | 1 | Cl | —C(=NH)—CH₃ | H | |
| 71 | 1 | Cl | —C(=NH)—(CH₂)₃CH₃ | H | |
| 72 | 1 | Br | —NH—C(=NH)—NHCH₃ | H | |
| 73 | 1 | Cl | —NH—C(=NH)—NH(CH₂)₂OH | H | |
| 74 | 1 | Cl | —NH—C(=NH)—NH—C₆H₅ | H | |
| 75 | 1 | Cl | —NH—C(=NH)—N(CH₃)₂ | H | |
| 76 | 1 | Cl | —NH—C(=NH)—NH—C₄H₉ | H | |
| 77 | 1 | Cl | —NH—C(=NH)—NH(CH₂)₂—C₆H₅ | H | |
| 78 | 3 | Cl | —SO₂NHCH₃ | H | |
| 79 | 3 | Cl | —SO₂N(CH₃)₂ | H | |
| 80 | 3 | Cl | —SO₂NHC₆H₅ | H | |
| 81 | 3 | Cl | —SO₂NHCH₂C₆H₅ | H | |
| 82 | 8 | Cl | pyrimidinyl | H | |
| 83 | 5 | Cl | —NH-quinolinyl | H | |
| 84 | 7 | Cl | 4-methylthiazolinyl | H | |
| 85 | 7 | Cl | 4,4-dimethylthiazolinyl | H | |
| 86 | 7 | Cl | 5-methylthiazolinyl | H | |
| 87 | 1 | Cl | —C(=NH)—NH—C(=NH)OC₂H₅ | H | |
| 88 | 5 | Cl | —(CH₂)₂—N(CH₃)—(CH₂)₂ | | |
| 89 | 6 | I | —CH₂CH₂OCH₃ | H | |
| 90 | 2 | Cl | —C₆H₄—Br | H | |

As mentioned previously, the compounds prepared by the process of this invention are useful diuretic and natriuretic agents. Because of the diversity of the compounds, although all are amide derivatives, they naturally present varying degrees of diuretic activity but within the dose limits mentioned below. They differ from most of the known, effective diuretic agents in that the compounds of this invention selectively enhance the execretion of sodium ions without causing an increase in excretion of potassium ions. The potassium ion loss, which is caused by known diuretics, often results in a severe muscular weakness. Since the compounds of this invention are essentially free of this potassium depletion, they have this decided advantage as diuretics. As diuretic agents, they can be used for the treatment of edema, hypertension and other diseases known to be responsive to this therapy.

It has also been found as another feature of this invention that when coadministered with other diuretic agents known to enhance the elimination of potassium ions along with sodium ions, many of the compounds of this novel process will reduce the excretion of potassium ions and thus overcome this undersirable property of the other diuretic agents. Many of the compounds of this process of this invention, theefore, are useful in combination with other classes diuretic agents in order to prevent the elimination of potassium ions which otherwise would be promoted by the other diuretics. In addition, the compounds of the novel process of this invention are useful by themselves as diuretic and/or saluretic agents.

In some instances, it may be desirable to use an acid addition salt of certain of these compounds, employing a pharmaceutically acceptable acid, and these salts are to be considered as included in this invention and in the scope of the claims.

The products of the novel process of this invention can be administered to man or animals in the form of pills, tablets, capsules, elixirs, injectable preparations and the like and can comprise the only essential active ingredient of the pharmaceutical formulation or, as mentioned above, they can be combined in pharmaceutical formulations with other diuretic agents or, indeed, other therapeutic agents.

The compounds of the novel process of this invention are advantageously administered at a dosage range of from about 5 mg./day to about 1000 mg./day or at a somewhat higher or lower dosage at the physician's discretion, preferably in subdivided amounts on a one to four times a day regimen.

The class of compounds which can be designated as pyrazinoylhydrazides generally do not spare potassium excretion to the same extent as the other compounds of this invention, but their diuretic and natriuretic activity is of approximately the same order, the effective dose being in the range of 5 mg./day to about 1000 mg./day.

The actual dose required of any of the products of the process of this invention depends on the degree of activity of the particular compound, the age, physical condition and seriousness of the disorder being treated and must be determined by the practitioner administering the active agent.

EXAMPLE 91

Dry filled capsule containing 10 mg. of active ingredient.

Per capsule, mg.
1-(3,5-diamino-6-chloropyrazinoyl)-3-hydroxyguanidine (from Example 18) _____ 10
Lactose _____ 313
Magnesium stearate _____ 2

Mixed powders _____ 325

Mix the (3,5-diamino-6-chloropyrazinoyl)-guanidine hydrochloride, from Example 18, lactose, and magnesium stearate and reduce to a No. 60 mesh powder. Encapsulate, filling 325 mg. in each No. 2 capsule.

EXAMPLE 92

Combination dosage form in dry filled capsule.

Per capsule, mg.
1-(3,5-diamino-6-chloropyrazinoyl)-3-benzyloxyguanidine, (from Example 19) _____ 15
Hydrochlorothiazide _____ 50
Magnesium stearate _____ 2
Lactose _____ 258

Mixed powders _____ 325

Mix all of the above ingredients, reduce to a No. 60 mesh powder and encapsulate, filling 325 mg. in each No. 2 capsule.

EXAMPLE 93

Dry filled capsule containing 10 mg. of active ingredient.

Per capsule, mg.
1-(3,5-diamino-6-chloropyrazinamido)-2,3-ethyleneguanidine (from Example 24) _____ 10
Lactose _____ 263
Magnesium stearate _____ 2

Mixed powders _____ 275

Mix the (3,5-diamino-6-chloropyrazinamido)guanidine, lactose, and magnesium stearate and reduce to a No. 60 mesh powder. Encapsulate, filling 275 mg. in each No. 2 capsule.

EXAMPLE 94

Dry filled capsule containing 50 mg. of active ingredient.

Per capsule, mg.
N-(3,5-diamino-6-chloropyrazinoyl)-benzamidine (from Example 40) _____ 50
Lactose _____ 273
Magnesium stearate _____ 2

Mixed powders _____ 325

Mix the N-(3,5-diamino-6-chloropyrazinoyl)benzamidine, lactose, and magnesium stearate and reduce to a No. 60 mesh powder. Encapsulate, filling 325 mg. in each No. 2 capsule.

EXAMPLE 95

Dry filled capsule containing 100 mg. of active ingredient.

Per capsule, mg.
N-(2-thiazolin-2-yl)-3,5-diamino-6-chloropyrazinecarboxamide hydrochloride hemihydrate (from Example 51) _____ 100
Lactose _____ 223
Magnesium stearate _____ 2

Mixed powders _____ 325

Mix all of the above ingredients, reduce to a No. 60 mesh powder and encapsulate, filling 325 mg. in each No. 2 capsule.

EXAMPLE 96

Dry filled capsule containing 50 mg. of active ingredient.

Per capsule, mg.
3,5-diamino-6-chloropyrazinoic acid 2-(2-quinolinyl)hydrazide (from Example 45) _____ 50
Lactose _____ 273
Magnesium stearate _____ 2

Mixed powders _____ 325

Mix all of the above ingredients, reduce to a No. 60 mesh powder and encapsulate, filling 325 mg. in each No. 2 capsule.

While the above examples describe processes for the preparation of certain compounds which are illustrative of the novel process of this invention and certain specific dosage forms suitable for administering the novel compounds, it is to be understood that the invention is not to be limited to the specific reaction conditions described in these examples, but is to be understood to embrace variations and modifications thereof which fall within the scope of the appended claims.

What is claimed is:

1. A process for the preparation of a compound of structural formula

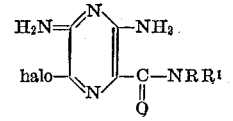

which comprises the treatment of a compound of structural formula

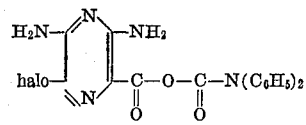

with a compound of formula HNRR¹ in an inert organic solvent wherein

R is a member selected from the group consisting of (1) 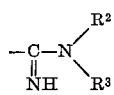

wherein
R² is a member selected from the group consisting of
(a) hydrogen,
(b) cyano,
(c) nitro,
(d) hydroxy,
(e) phenyl-lower alkoxy,
(f) lower alkyl,
(g) hydroxy-lower alkyl,
(h) phenyl-lower alkyl, and
(i) pyridyl-lower alkyl, and
R³ is a member selected from the group consisting of
(a) hydrogen, and
(b) lower alkyl;

(2) 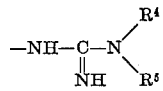

wherein
R⁴ is a member selected from the group consisting of
(a) hydrogen,
(b) amino,
(c) phenyl,
(d) lower alkyl,
(e) hydroxy-lower alkyl, and
(f) phenyl-lower alkyl,
R⁵ is a member selected from the group consisting of
(a) hydrogen, and
(b) lower alkyl;

(3) 

wherein
R⁶ is a member selected from the group consisting of
(a) lower alkyl, and
(b) phenyl;

(4) 

wherein
R⁷ is a member selected from the group consisting of
(a) hydrogen,
(b) lower alkyl,
(c) aromatic heterocycle of 5–6 members containing 1–2 nuclear nitrogen atoms,
(d) aromatic heterocycle of 5–6 members containing 1–2 nuclear nitrogen atoms and fused to a benzene ring, and
(e) phenyl-lower alkyl,
R⁸ is a member selected from the group consisting of
(a) hydrogen, and
(b) lower alkyl,
R⁷ and R⁸ when taken together can be phenyl-lower alkylidene, and
R⁷ and R⁸ when each represents lower alkyl can be linked directly together or through an oxygen atom to form with the nitrogen atom to which they are attached, a saturated 5–7 membered heterocycle;

(5) heterocycle of 5–6 members containing 1 nitrogen atom and up to 2 other hetero atoms selected from nitrogen, oxygen and sulfur and substituted with hydrogen, lower alkyl or phenyl or fused to a benzene ring;

(6) lower alkyl;

(7) lower alkyl substituted with a member selected from the group consisting of
(a) cyano,
(b) lower alkoxymethyl,
(c) di(lower alkoxy)methyl,
(d) lower alkoxycarbonyl,
(e) hydroxy,
(f) phenyl,
(g) aromatic heterocycle of 5–6 members containing up to 1 hetero atom selected from oxygen and nitrogen, and
(h) amino of structure

wherein
R⁹ is a member selected from the group consisting of
(1) hydrogen,
(2) lower alkyl, and
(3) a heterocycle of 5–6 members containing up to 2 nitrogen atoms only,
R¹⁰ is a member selected from the group consisting of
(1) hydrogen, and
(2) lower alkyl, and
R⁹ and R¹⁰ when lower alkyl can be linked together directly or through an oxygen or nitrogen atom to form a 5–7 membered saturated heterocycle;

(8) lower alkenyl,
(9) lower alkynyl,
(10) phenyl,
(11) halophenyl,
(12) lower alkylphenyl,
(13) lower alkoxyphenyl,
(14) —SO₂NR¹¹R¹²
wherein
R¹¹ is a member selected from the group consisting of
(a) hydrogen,
(b) lower alkyl,
(c) phenyl-lower alkyl, and
(d) phenyl, and
R¹² is a member selected from the group consisting of
(a) hydrogen, and
(b) lower alkyl;

(15) 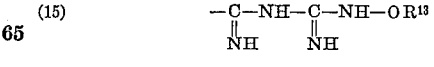

wherein
R¹³ is a member selected from the group consisting of
(a) lower alkyl, and
(b) phenyl-lower alkyl;

(16) cyano;
R¹ is a member selected from the group consisting of
(1) hydrogen, and (2) lower alkyl;

R$^1$ and R$^2$ when lower alkyl can be linked together directly to form with the nitrogen atom to which they are attached, a 3–7 membered saturated heterocycle;

R$^1$ and R$^2$ when lower alkyl can be linked together through a second hetero atom selected from oxygen and nitrogen, which when itrogen can be substituted with lower alkyl, to form a 6-membered heterocycle with the nitrogen atom to which they are attached;

halo is a member selected from the group consisting of
(1) chloro,
(2) bromo, and
(3) iodo.

2. The process as claimed in claim 1, wherein the reaction is conducted in a solvent selected from the group consisting of a lower alkanol, and a polar aprotic solvent at a temperature from ambient to reflux temperature of the reaction mixture.

3. The process as claimed in claim 1, wherein R is

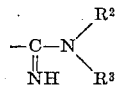

and R$^1$, R$^2$, R$^3$ and halo are as defined therein.

4. The process as claimed in claim 3, wherein R$^1$, R$^2$, R$^3$ are each hydrogen, and halo is chloro.

5. The process as claimed in claim 1, wherein R is

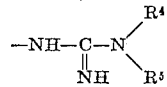

and R$^1$, R$^4$, R$^5$ and halo are as defined therein.

6. The process as claimed in claim 5, wherein R$^1$, R$^4$ and R$^5$ are each hydrogen, and halo is chloro.

7. The process as claimed in claim 1, wherein R is

and R$^1$, R$^6$ and halo are as defined therein.

8. The process as claimed in claim 1, wherein R is

and R$^1$, R$^7$, R$^8$ and halo are as defined therein.

9. The process as claimed in claim 1, wherein R is a heterocycle of 5–6 members containing 1 nitrogen atom and up to 2 other hetero atoms selected from nitrogen, oxygen and sulfur and substituted with hydrogen, lower alkyl or phenyl, or fused to a benzene ring, and R$^1$ and halo are as defined in claim 1.

10. The process as claimed in claim 9, wherein the heterocycle is selected from 4-phenylthiazol-2-yl, thiazol-2-yl, 1,2,4-triazol-3-yl, benzimidazol-2-yl, 4 - phenyloxazol-2-in-2-yl, 4-methylthiazol-2-yl, and thiazol-2-in-2-yl.

11. The process as claimed in claim 1, wherein R is a member selected from the group consisting of
(a) lower alkyl,
(b) cyano-lower alkyl,
(c) lower alkoxymethyl-lower alkyl,
(d) di(lower alkoxy)methyl-lower alkyl,
(e) lower alkoxycarbonyl-lower alkyl,
(f) hydroxy-lower alkyl,
(g) phenyl-lower alkyl,
(h) aromatic heterocycle-lower alkyl, wherein the heterocycle is of 5–6 members containing up to 1 hetero atom selected from oxygen and nitrogen,
(i) lower alkenyl,
(j) lower alkynyl,
(k) phenyl,
(l) halophenyl,
(m) lower alkyl-phenyl,
(n) lower alkoxy-phenyl, and
(o) cyano, and R$^1$ and halo are as defined therein.

12. The process as claimed in claim 1, wherein R is lower

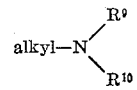

wherein R$^1$, R$^9$, R$^{10}$ and halo are as defined therein.

13. The process as claimed in claim 1, wherein R is —SO$_2$NR$^{11}$R$^{12}$ wherein R$^1$, R$^{11}$, R$^{12}$ and halo are as defined therein.

14. The process as claimed in claim 13, wherein R$^{11}$ and R$^{12}$ are each hydrogen.

15. The process as claimed in claim 1, wherein R is

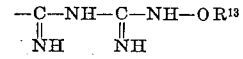

and R$^1$, R$^{13}$ and halo are as defined therein.

16. The process as claimed in claim 15, wherein R$^{13}$ is hydrogen or benzyl.

17. A compound of structural formula

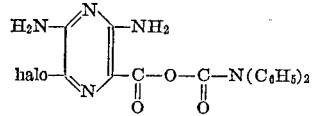

wherein halo is chloro, bromo or iodo.

No references cited.

NICHOLAS S. RIZZO, Primary Examiner

U.S. Cl. X.R.
260—247.2; 424—250